United States Patent
Garney et al.

(10) Patent No.: US 6,678,761 B2
(45) Date of Patent: Jan. 13, 2004

(54) METHOD AND APPARATUS FOR BUDGET DEVELOPMENT UNDER UNIVERSAL SERIAL BUS PROTOCOL IN A MULTIPLE SPEED TRANSMISSION ENVIRONMENT

(75) Inventors: John I. Garney, Portland, OR (US); John S. Howard, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 488 days.

(21) Appl. No.: 09/823,798

(22) Filed: Mar. 30, 2001

(65) Prior Publication Data

US 2002/0144031 A1 Oct. 3, 2002

(51) Int. Cl.⁷ .............. G06F 3/00; G06F 5/00; G06F 5/06
(52) U.S. Cl. .............. 710/60; 710/4; 710/30; 710/33; 710/60; 710/100; 709/233
(58) Field of Search .............. 710/4, 29, 30, 710/33, 58, 60, 100, 107

(56) References Cited

U.S. PATENT DOCUMENTS

| | | | | |
|---|---|---|---|---|
| 5,784,581 A | * | 7/1998 | Hannah | 710/110 |
| 5,890,015 A | * | 3/1999 | Garney et al. | 710/62 |
| 6,067,591 A | * | 5/2000 | Howard et al. | 710/100 |
| 6,219,736 B1 | * | 4/2001 | Klingman | 710/315 |
| 6,308,215 B1 | * | 10/2001 | Kolbet et al. | 709/233 |
| 6,389,029 B1 | * | 5/2002 | McAlear | 370/402 |
| 6,505,263 B1 | * | 1/2003 | Larson et al. | 710/100 |

FOREIGN PATENT DOCUMENTS

| | | | | |
|---|---|---|---|---|
| WO | WO 00/49507 | 8/2000 | | G06F/13/38 |
| WO | WO 01/08018 | 2/2001 | | G06F/13/40 |

* cited by examiner

Primary Examiner—Jeffrey Gaffin
Assistant Examiner—Angel L Casiano
(74) Attorney, Agent, or Firm—Kenyon & Kenyon

(57) ABSTRACT

A system and method for serial bus budget development and maintenance. The present invention relates to a method for budgeting transactions under a Universal Serial Bus (USB) protocol, utilizing split transactions, such as USB 2.0. The present invention provides for budgeting transactions occurring across a high-speed to full/low-speed translation, accommodating the full/low speed transactions as well as high-speed splits and data overhead in accordance with USB protocol.

31 Claims, 16 Drawing Sheets

METHOD AND APPARATUS FOR BUDGET DEVELOPMENT UNDER UNIVERSAL SERIAL BUS PROTOCOL IN A MULTIPLE SPEED TRANSMISSION ENVIRONMENT

BACKGROUND INFORMATION

The present invention relates to serial bus budget development and maintenance. More specifically, the present invention relates to a method for budgeting transactions under a Universal Serial Bus (USB) protocol, utilizing split transactions, such as USB 2.0 (Revision 2.0; Apr. 27, 2000). Present invention is related to application titled, "Method and Apparatus for improving Time Constraints and Extending Limited Length Cables in a Multiple-Speed Bus", filed on Mar. 30, 2001 (Ser. No. 09/823,455) even date herewith.

There are several methods for enabling communication between computers and between a computer and peripheral devices in the art today. One method of communication utilizes the Universal Serial Bus (USB) protocol. USB provides a computer with a means for communicating with up to 127 devices using a single, standardized communication scheme. USB version 1.0 (USB Rev. 1.1; USB Implementers Forum, Inc.) is capable of transmission speeds of 1.5 Megabits (Mbps) ("Low" Speed) and 12 Mbps ("Full" Speed). A newer version of USB has been developed that incorporates various advantages over USB 1.0, including much accelerated data transmission. Titled "USB 2.0", the new version is approximately forty times faster than USB 1.0. It transmits data at 480 Mbps, called "high" speed (compared to the 12 Mbps of USB 1.0, 'full' speed).

In order to provide the advantages of USB 2.0, the stringency of many of the timing requirements in the protocol were vastly increased. In addition, various elements were added to provide for speed translation, etc., adding to the protocol's complexity.

A method for USB 1.0 budget development is known in the art. Although the USB 2.0 specification describes potential for budgeting/scheduling transactions, it does not provide any particular method for achieving this. As described below, means used according to USB 1.0 would be ineffective for budgeting USB 2.0 transactions. In addition to other problems, a method for budgeting USB 2.0 transactions must accommodate for transaction translation between high speed and fall/low speed—a capability that USB 1.0 budgeting means do not possess.

Accordingly, there is a need for an improved method and apparatus for budgeting transactions under a USB protocol.

DETAILED DESCRIPTION

Although the USB 1.0 method of budget development and manipulation is effective for communications involving solely USB 1.0's full/low-speed transactions, it is unable to address the added limitations and complexity imposed by USB 2.0, which supports both full/low-speed and high-speed transactions, as well as the translation between the two.

Figure 1:
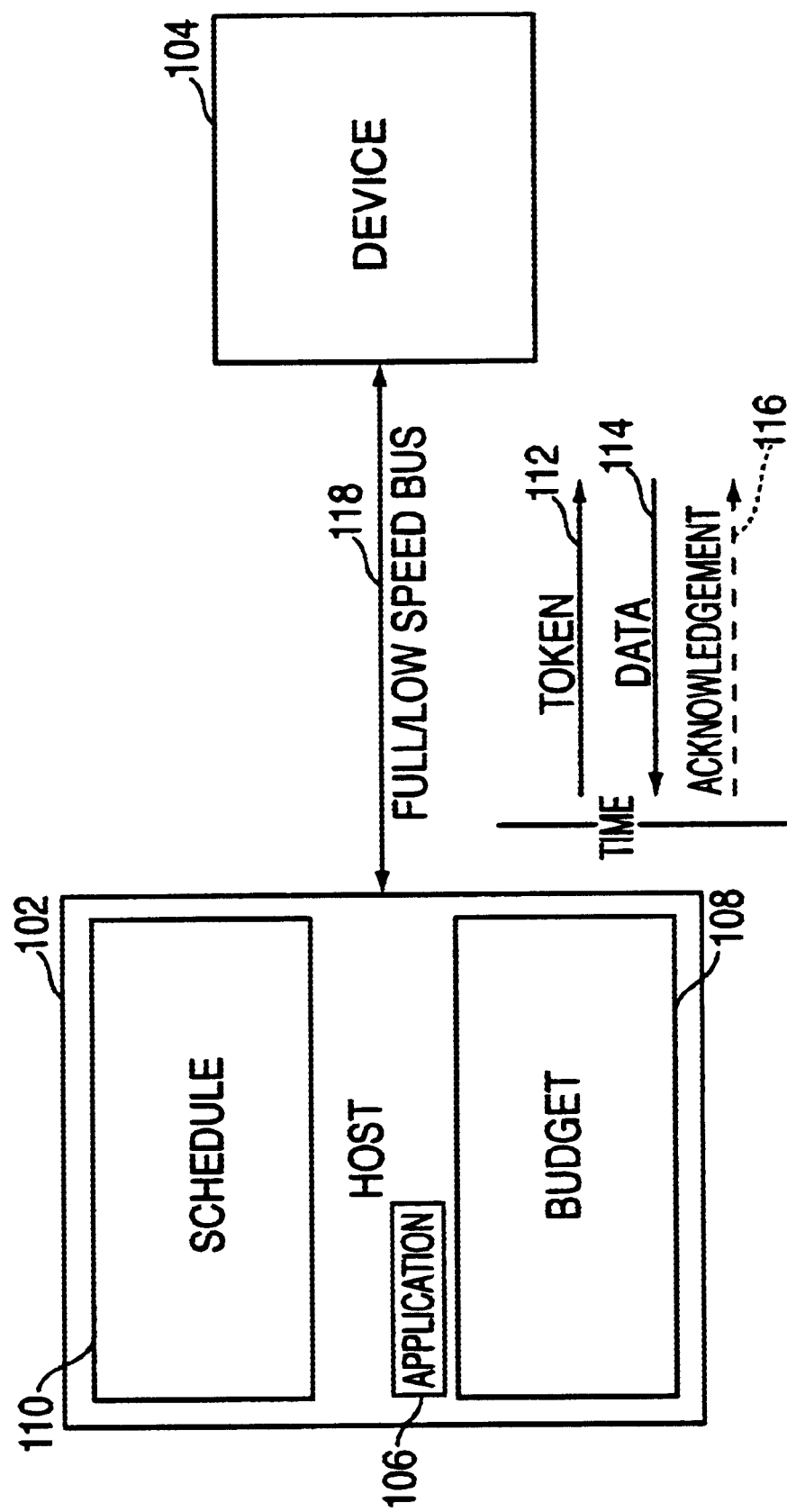
FIG. 1 provides a diagram illustrative of the physical layout of a host and device under USB 1.0 protocol as known in the art.

FIG. 1 provides a diagram illustrative of the physical layout of a host 102 and device 104 under USB 1.0 protocol. Upon USB attachment of a new device 104 to a host 102, such as a computer system, the host 102 initially senses the addition. A verification process is performed establishing that the host recognizes a device has been attached and that it was attached by a full/low-speed USB connection 118. At this point, a computer user would typically be notified that the device 104 was recognized, and the user would be asked if an appropriate application 106 should be launched to operate the device 104.

A typical periodic transaction (Isochronous or Interrupt) between a host 102 and a device 104 consists of the transfer of a token 112, data 114, and an acknowledgement 116. For an 'In' transaction, as an example, a token 112 is sent by the host 102 (master) via a full/low-speed bus 118 to the device 104 (slave) requesting necessary data 114. Upon development, the device 104 sends the data 114 to the host 102. At this point, if the host 102 receives the complete data 114, it may (depending on transaction requirements) send back to the device 104 an acknowledgement 116 of receipt. For an 'Out' transaction, data 114 is sent by the host 102 to the device 104, and an acknowledgement may be sent by the device 104 back to the host 102.

A budget 108 and a schedule 110 are utilized by the host to coordinate transactions such as this. Neither the budget 108 nor schedule 110 are altered upon the initial sensing of the device 104. Upon activation of the appropriate application 106 for the device 104, transaction parameters, such as size, type, and period, are registered to potentially add this device 104 (the device's 104 transactions) to the host's 102 budget 108, and upon impending communication between host 102 and device 104, the budget 108 information is utilized by the schedule 110 for the communication. The budget 108 is developed to make sure that all desired transactions may be implemented within their respective timing constraints even under worst case scenarios. The budget 108 establishes the relative timing for each transaction (endpoint) for optimization and is used to decide whether additional transactions may be added based on time (size) availability. The schedule 110 refers to the budget 108 in implementing the specific transactions. Although the actual, specific transactions may take less time than has been allocated by the budget's worst case scenario, the schedule's maintaining the timing boundaries prescribed prevents timing problems.

The timing of USB 1.0 events is demarcated by segments known as 'frames'. Each frame is equal to one millisecond (mSec.) of time, and within each frame, the last ten percent of time is devoted to only non-periodic transactions (Control and Bulk). The first ninety percent of each frame is left for periodic transactions.

Figure 2:
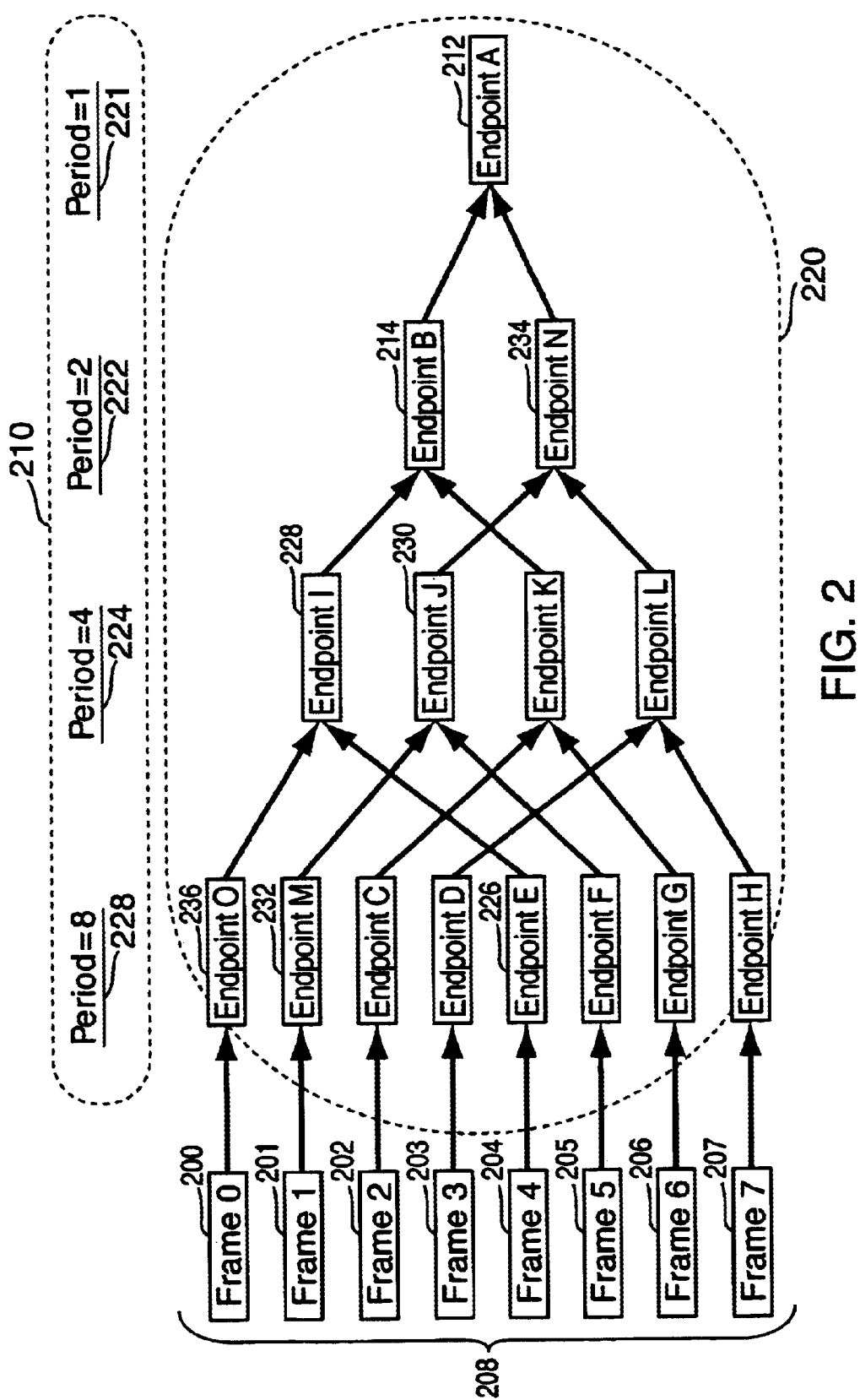
FIG. 2 utilizes an endpoint tree to illustrate the timing of device transactions with respect to their scheduling as known in the art.

FIG. 2 utilizes an endpoint tree to illustrate the timing of device transactions with respect to their scheduling. For periodic transactions, each device is associated to at least one transaction that is performed routinely, as dictated by the transaction's period. Each transaction is associated to a uniquely addressable endpoint on a device as a source or sink of information (data) in the communication flow.

A budget 108 (See FIG. 1) represents a finite span of time that loops indefinitely. Known as the 'budget window' 208, the span of time for USB 1.0 may be any power of two frames, such as eight frames (eight mSecs) as shown in FIG. 2. Each endpoint (transaction) has a necessary period 210 that is established upon interaction with an appropriate application 106 (See FIG. 1). The endpoint's period 210 represents the frequency, in terms of frames, in which the host 102 (See FIG. 1) must send data to or receive data from the endpoint. If the period 210 is greater than the size of the budget 108 (more frames), the period is considered to be the budget size (eight). It does not cause any problems to provide information to or check for information from a device 104 (See FIG. 1) more often than is necessary. In FIG. 2, many endpoints 220 are provided that might be allocated in a typical host's budget 108 (See FIG. 1). Besides a period 221 equal to one, endpoint periods 210 are typically powers of two so that the budget window 208, which is of a power of two frames, can allocate only specific frames to the endpoint. Otherwise, the frame location(s) of the endpoint within the budget window 208 would have to shift for each repetition of the (looping) budget 108 (See FIG. 1). If this were the case, the same span of time for every frame in the budget window 208 would have to be allocated to the endpoint, even if the endpoint's period was seven, for example. It would eventually hit every frame location.

The different endpoints handled by each frame are provided in FIG. 2. The illustration does not show the size of the transactions or the relative order of transactions per frame. The figure is primarily used to describe the cyclic nature of the various endpoints 220 with respect to differing periods 210 and the effect of endpoint placement within the budget window 208. As an example, Endpoint O 236 has a period 228 of eight. It has been placed in the first frame (Frame 0 200) of the budget window 208. In every cycle of the schedule that is representative of this budget 108 (See FIG. 1), Endpoint O 236 will be handled in Frame 0 200 only. It will then maintain a consistent period of eight. Also to Frame 0 200, Endpoint I 228 has been allocated. Endpoint I has a period of four 224. Because Frame 0 200 has been chosen as the first instance of Endpoint I 228, Frame 4 204, which is four frames after Frame 0 200, is utilized to handle Endpoint I 228 again in the budget window 208.

Endpoint N 234 has a period of two 222, and thus, must be addressed in every other frame. The initial frame of Endpoint N 234 was chosen as Frame 1 201. During Frame 1 201, Endpoint N 234 is handled, as well as Endpoint M 232 (period of eight 228), Endpoint J 230 (period of four 224), and Endpoint A 212 (period of one 221).

Figure 3:
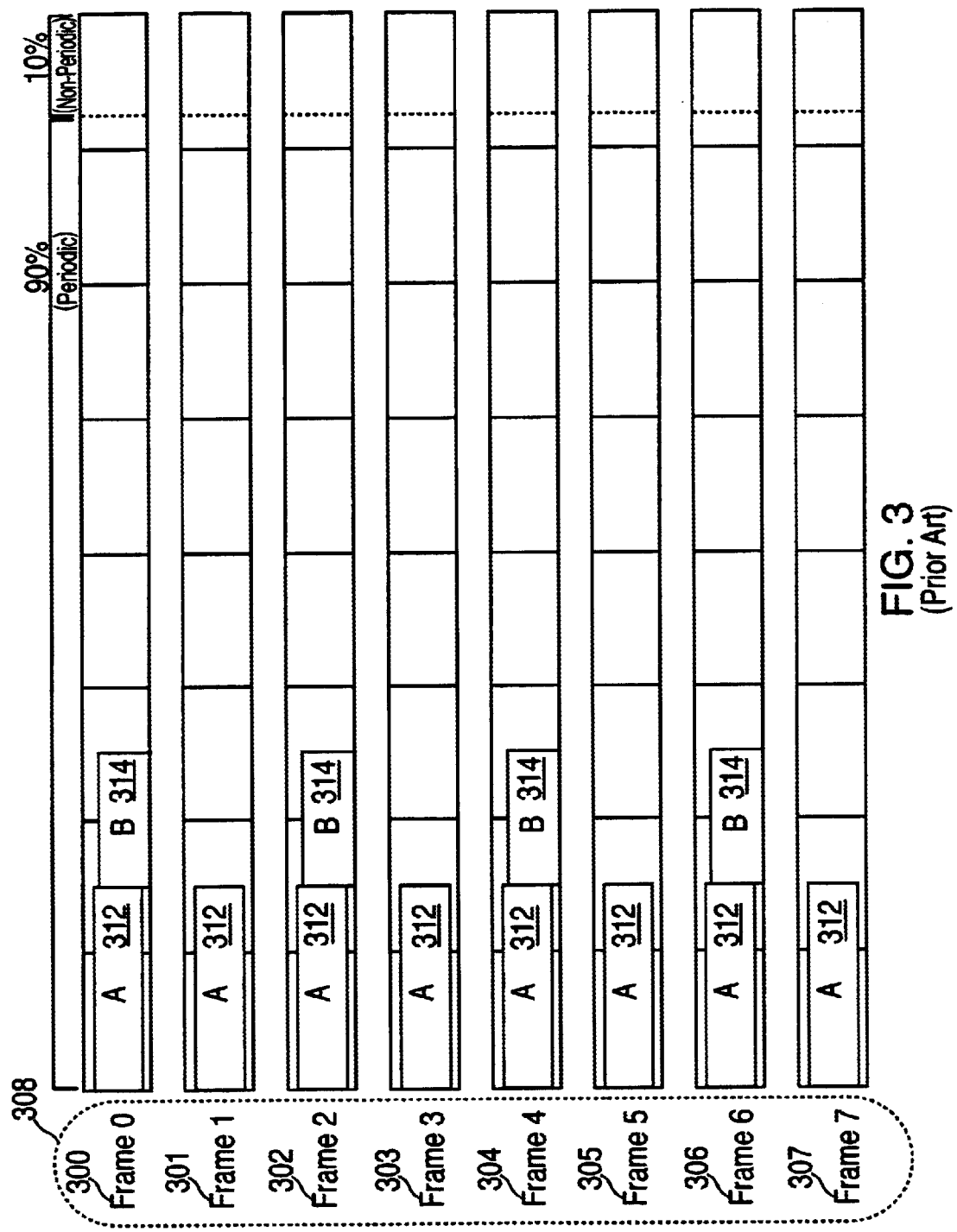
FIG. 3 provides a time chart illustrating transactions performed in each frame of a budget window under USB 1.0 as known in the art.

FIG. 3 provides a time chart illustrating transactions performed in each frame of a budget window under USB 1.0. The original budget has transactions (endpoints) A 312 and B 314. Transaction A 312 has a period of one and thus occurs in every frame 308. Placed after transaction A 312 in the appropriate frames 308 is transaction B 314. Transaction B 314 has a period of two and thus occurs every other frame 308, in Frames 0, 2, 4, and 6 300, 302, 304, 306. The order of transactions within the frames 308 is based on the host controller (host 102, See FIG. 1), budget implementation details, and the types of transactions included in the budget 108 (See FIG. 1). Interrupt transactions should be scheduled slowest (least frequent) period to fastest period. By contrast, Isochronous transactions should be scheduled fastest to slowest period. Further, all Isochronous transactions should be scheduled before any Interrupt transactions. Timing priorities such as these are not recognized by budgeting techniques in the art. USB 1.0 budgeting simply adds new transactions (endpoints) to the end of preexisting transactions, even though they might be more appropriately inserted in front of the transactions or in between transactions.

Figure 4:
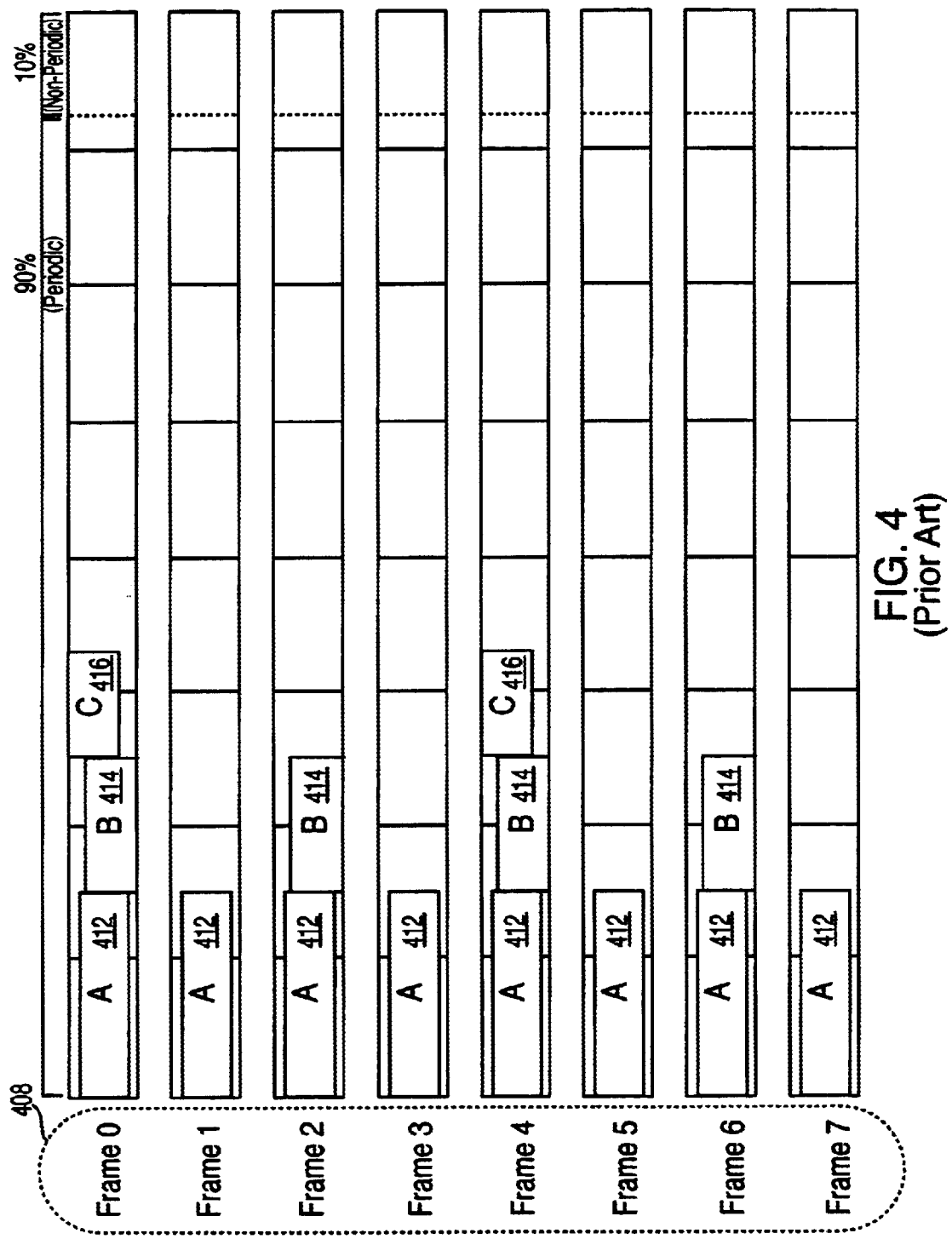
FIG. 4 provides a time chart illustrating the insertion of a transaction to the budget provided in FIG. 3 under USB 1.0 as known in the art.

FIG. 4 provides a time chart illustrating the addition of a transaction to the budget provided in FIG. 3 under USB 1.0. Transaction C 416 is added to the end of the frames behind Transactions A 412 and B 414. As stated above, under USB 1.0, transaction additions are added only behind preexisting transactions of the budget.

Figure 5:
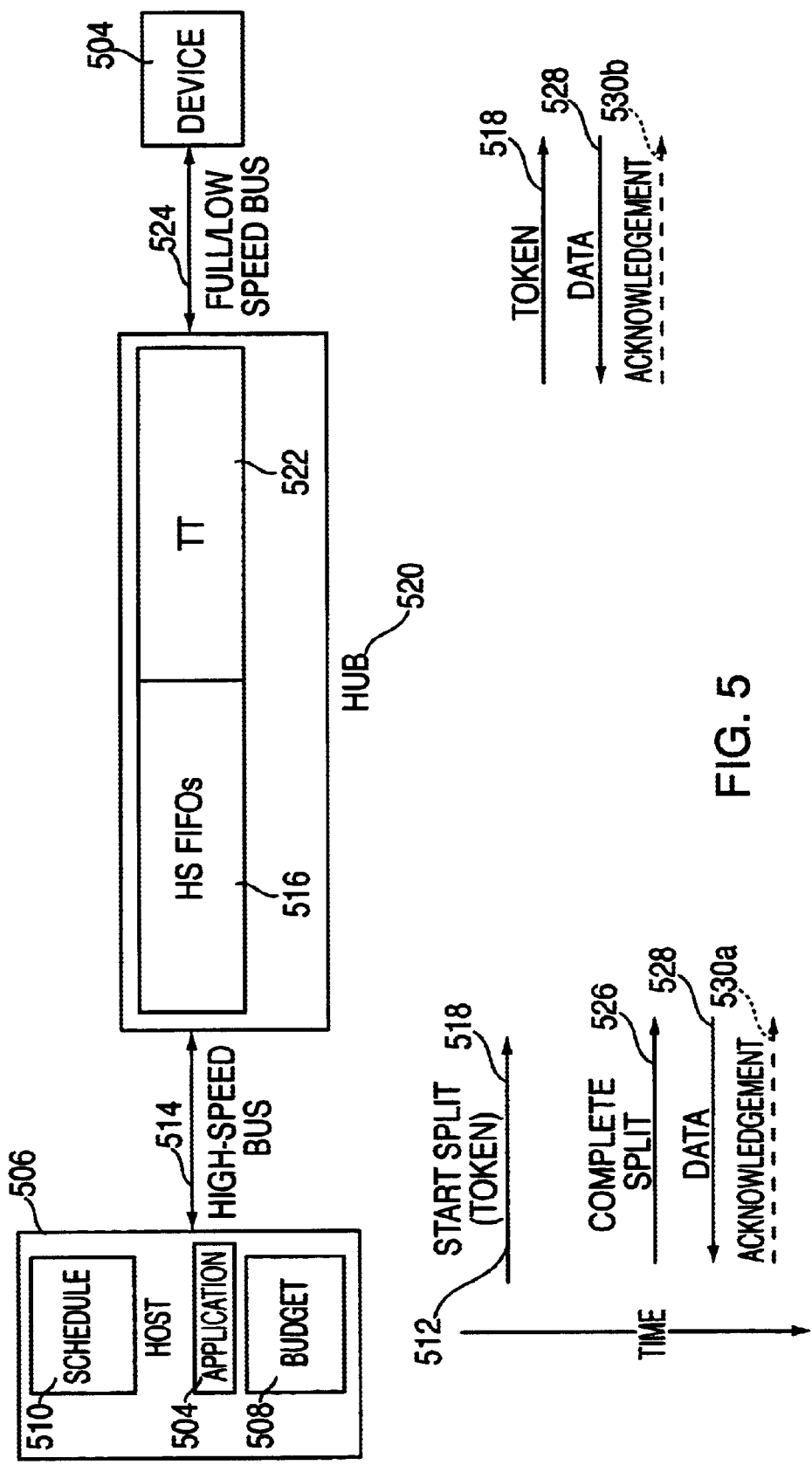
FIG. 5 provides an illustration of the interaction of components involved in speed translation and communication between a host and device with USB 2.0 under principles of the present invention.

FIG. 5 provides an illustration of the interaction of components involved in speed translation and communication between a host and device with USB 2.0 under principles of an embodiment of the present invention. In this embodiment, upon attachment of a device 502 and launch of an appropriate application 504, the device's 502 transaction (s) (endpoint(s)) are added to the host's 506 budget, as described below. In one embodiment, the host's 506 schedule 510 is updated with the timing information of the budget 508 immediately before communication is necessary between host 506 and device 502. Similar to USB 1.0, the schedule 510, which is mirrored from the budget 508 at appropriate times, acts as the timing controller of communications between the host 506 and device 502.

USB 2.0 utilizes 'split transactions' for speed translation. Upon being initiated by the schedule 510, the host 506, in an 'In' transaction, for example, sends a preliminary message, called a 'start split' 512, along a high-speed bus 514 to a set of high-speed 'First-In, First-Out' buffers (FIFOs) 516 within a speed translation hub 520. The start split 512 contains an encoded representation of the data request token 518 to be sent to the device 502. The FIFOs 516 forward the token 518 (representation) on to a transaction translator (TT)

522, which coordinates the timing of the token 518 release to be appropriate for full/low speed. The token 518 is forwarded via a fall/low speed bus 524 to the device 502.

In response, the device 502 sends the appropriate data 526 back over the full/low-speed bus 524, through the TT 522, and on to the FIFOs 516 to be held there. If required, an acknowledgement 530b is returned to the device 502 from the TT 522 to prevent the device 502 from timing out. At this point in time, a simple, non-'split transaction' data request attempting speed translation would have timed out by the host 506, assuming that the device 502 is currently unreachable. However, under the split transaction protocol, a start split 512 is sent from the host 506 in order to begin the process, and then the host 506 and high-speed bus 514 are freed to perform other operations (multiplexing) while a result is being generated and transmitted by the device 502. At some appropriate time after sending the start split 512, the host 506 sends a complete split 526 to the FIFOs, in expectation of the data 528 finally being there. In response to the complete split 526, the FIFOs 516 forward the data 528 to the host 506, and if appropriate, an acknowledgement 530a is provided by the host 506, which is not forwarded beyond the hub 520. The actual, host-generated 506 acknowledgement 530a might not arrive at the device 502 before the device 502 times out. Therefore, as stated above, the TT 522 sends its own acknowledgement 530b immediately after receiving the data 528 from the device 502 to satisfy the device 502 (the true acknowledgement 530b is not forwarded beyond the hub 520). As explained later, note that multiple (typically two) complete splits 526 are usually provided following the first complete split 526 for error recovery. For clarity, the additional complete splits are not described in FIG. 5.

Figure 6:
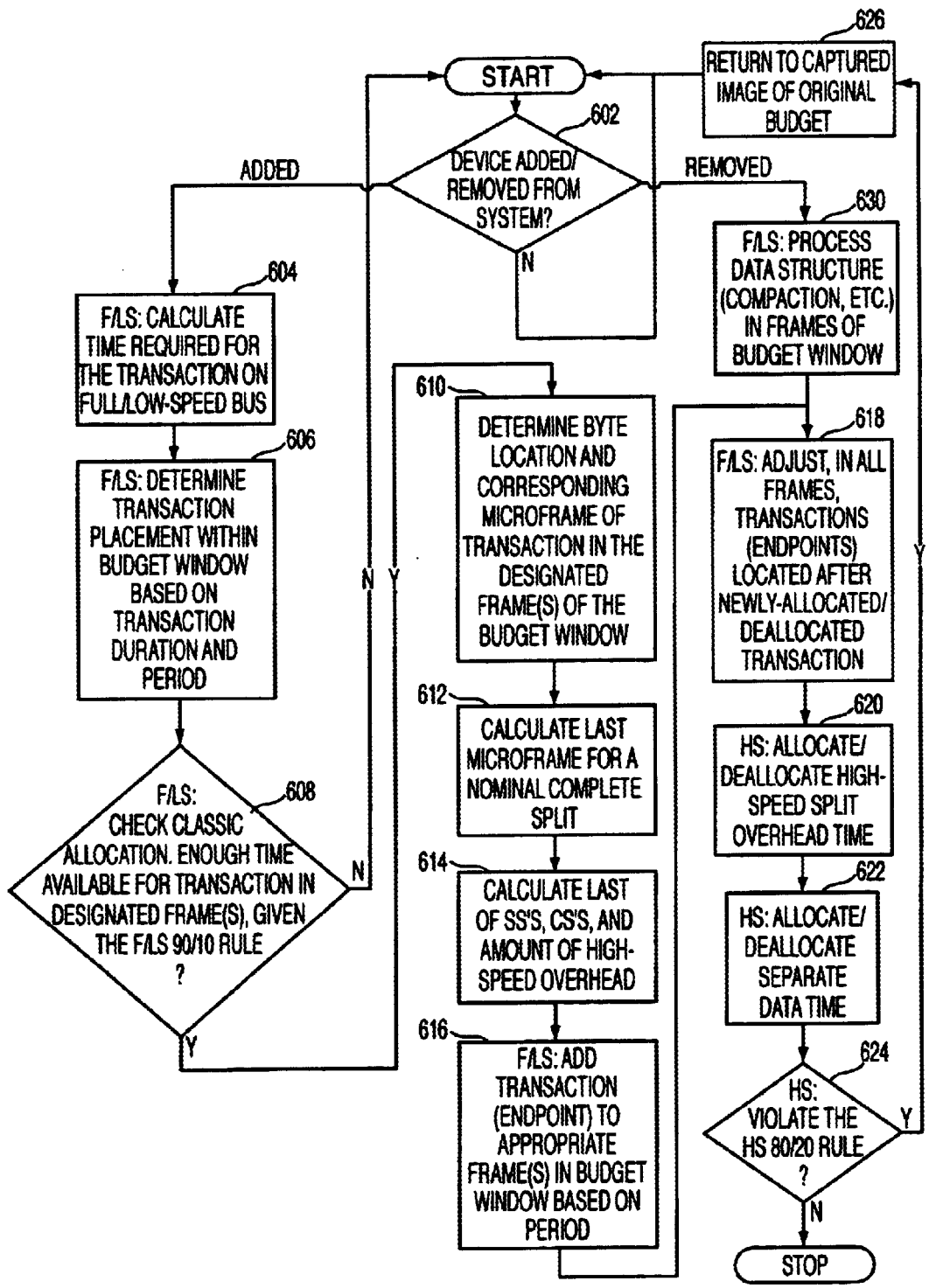
FIG. 6 provides a flowchart illustrating a sequence of events for an embodiment of the budgeting method under principles of the present invention.

FIG. 6 provides a flowchart illustrating a sequence of events for an embodiment of the budgeting method under principles of the present invention. In one embodiment, a system would first sense a device either being added to or removed from the USB 2.0 host 602. If a device is added (attached) to the host, upon launch of an appropriate application, the system determines 604, for each endpoint (transaction) associated to the newly attached device, the amount of time necessary to complete the transaction, given the type (Isochronous, Interrupt, etc.), direction ('In' or 'Out'), and maximum data size of the transaction. In one embodiment, once the transaction duration is determined 604, the placement of the transaction within the budget window is determined 606, giving the transaction a potential frame (or frames) within which to reside. The placement is determined based on the transaction duration as well as the period of the transaction (number of frames between occurrences of the transaction). This can be done utilizing known algorithms such as 'Best Fit', 'First Fit', and 'Minimum Fit'.

Under USB protocol, the last ten percent of each classic (full/low-speed; 'F/LS') frame is devoted exclusively to non-periodic transactions (Bulk and Control), leaving the remaining ninety percent for periodic transactions (Isochronous and Interrupt). In one embodiment, if the optimal frame(s) chosen for potential transaction insertion would be violative of this '90/10' rule 608 with the transaction addition, no further analysis need be done and the device addition is not allowed at this time. If however, the frame(s) chosen have enough available time space to accommodate the transaction, the potential location of the beginning of the transaction in the frame(s) is determined (as a byte location number) 610. Further, the specific microframe (or microframes, depending on transaction duration) of the frame(s), associated to this byte location, is determined 610 for the high-speed bus.

Next, in one embodiment, the last microframe for a nominal complete split on the high-speed bus is determined 612. Complete splits are established for each sequential microframe, from the first microframe after the microframe at the transaction byte location (nominal complete split) and continuing until (typically) three microframes after the last microframe associated to the transaction 612. (See FIGS. 7–16.) Note that no complete splits are utilized for an Isochronous 'Out' transaction. ('Out' transactions requires data with the start split only, and since the transaction is Isochronous, it does not require an acknowledgement.) After the potential complete splits have been established 612, the amount of start splits (one is allocated to the microframe immediately before the microframe at the transaction byte location), complete splits, and high speed overhead is calculated 614. The high-speed overhead includes the size (duration) to be allocated for the data transmission over the high-speed bus. It is determined by the type of transaction as well as whether it is an 'In' or 'Out' transaction. (For an 'In', data allocation is necessary near only the one start split. For an 'Out', data allocation is necessary near each of the complete split allocations.) (See FIGS. 7–16.)

In one embodiment, the transaction is added to each appropriate frame in the budget window based on the transaction period 616. After the transactions are added 616, all occurrences of each of one or more of the transactions in the budget window are adjusted within the frames forward or back in time 618. This manipulation is performed to optimize the budget, possibly placing occurrences of a transaction into a previously unfilled 'hole' where no previously attempted transaction could fit because of the transaction's duration and/or period causing conflicts. Also, the manipulation is performed to be consistent with protocol, e.g. increasing to decreasing period, depending on type, etc., as explained above. (See FIGS. 7–16)

Next, in one embodiment, in looking to the high-speed bus, the high-speed split overhead (start and complete splits) 620 and data overhead 622 are allocated. The necessary space for splits and data are totaled in each microframe of the budget, consistent with their respective full/low-speed transactions (new and old). As stated above, the duration of the high-speed (HS) data portion is proportional to the size of the full/low-speed (F/LS) data duration, the data duration being much shorter. Also, as stated above, a data allocation will be provided with the start split ('Out') or with all of the complete splits ('In'). In one embodiment, the (HS) start split requires 40 bytes, each (HS) complete split requires 40 bytes and each data packet can require up to 188 bytes (since a F/LS bus can only transmit 188 bytes worth of information during a microframe period of time (125 $\mu$Sec.)). If the transaction will not continue throughout the entire microframe, either because the transaction is to start during the microframe, finish during the microframe, or both, some allocation less than 188 bytes can be provided.

Similar to the 90/10 rule for F/LS transmissions, USB 2.0 mandates an '80/20' rule for HS transmissions. For each microframe (as opposed to each frame in F/LS 90/10), the last twenty percent is devoted to non-periodic transactions. In one embodiment of the present invention, each microframe in the budget window is evaluated to make sure that this 80/20 rule is not violated 624. If the rule is violated (and compaction, explained below, won't correct the problem), the transaction is not added to the budget. The budget is then returned to its original state 626 (by reference to a captured image of its original state, etc.). If, however, the 80/20 rule is not violated, in one embodiment, the newly updated budget is utilized.

In one embodiment, if a device is removed (detached) from the host, the device's transaction(s) (endpoint(s)) are removed from the budget. A process known as 'compaction' also occurs which involves moving each occurrence of different transactions closer together where possible to fill the hole(s) left by each of the removed transaction(s) 630. In another foreseen embodiment, compaction does not occur until it is needed, such as when a budget change for a device addition is about to be performed.

After endpoint removal and compaction 630, the remaining F/LS transaction(s) are moved around for optimization 618 (if possible) and the removed transaction's HS splits 620 and data packets 622 are deallocated. As long as the resulting changes do not violate the 80/20 rule 624, the newly modified budget is utilized.

Figure 7:
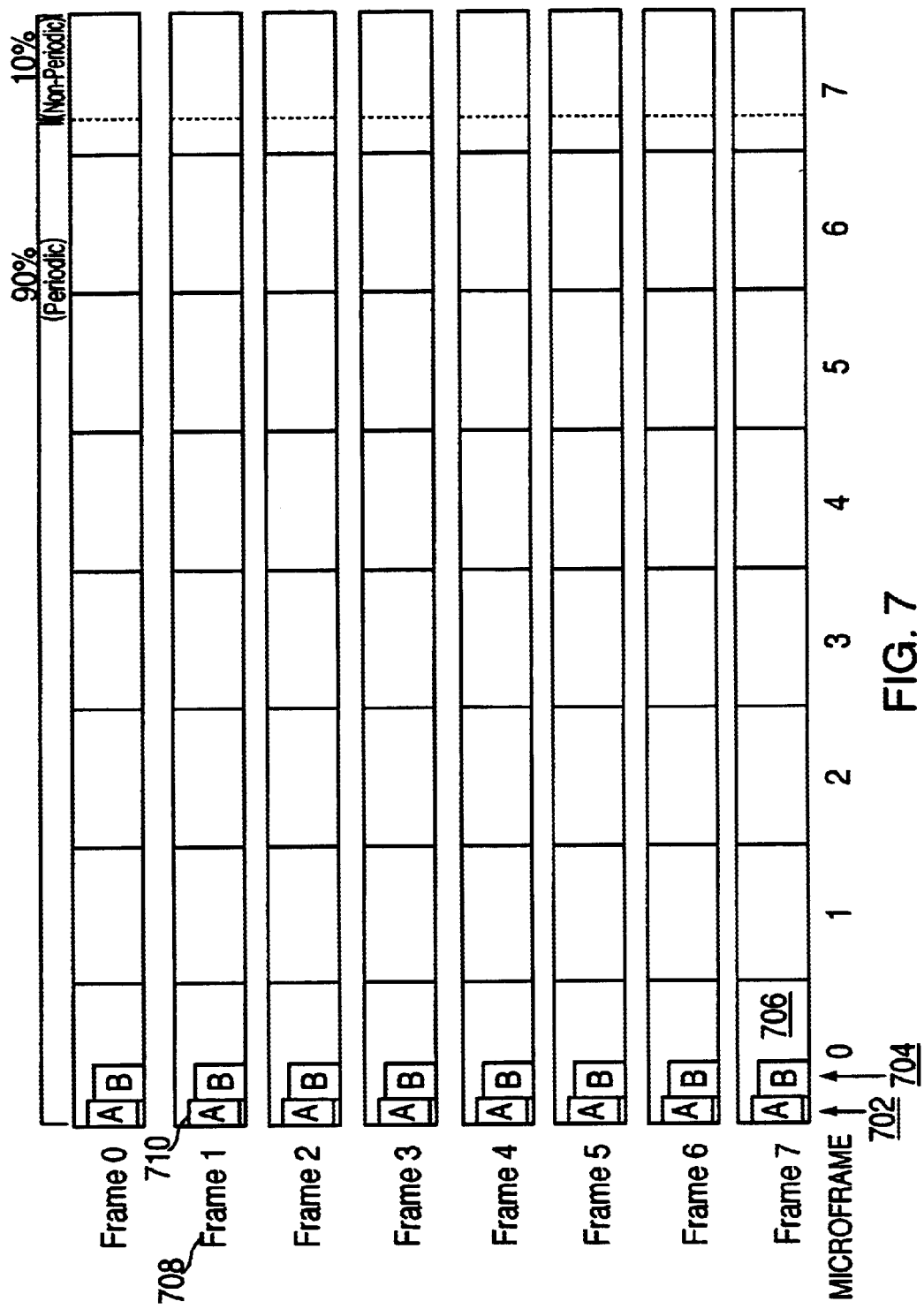
FIG. 7 provides a time chart illustrating the full/low-speed (F/LS) activity of an example budget, 'Budget 1', under principles of the present invention.

FIG. 7 provides a time chart illustrating the F/LS activity of an example budget, 'Budget 1', under principles of the present invention. This F/LS (classic) chart shows the timing of events on the F/LS bus (speed-translating hub to device). Already provided in this budget are allocations for two transactions, A 702 and B 704, each with a period of one. The term, 'microframe' doesn't really have a meaning in the realm of F/LS transmissions, but it is important to note the relative microframe location of these transactions in order to understand the associated, respective HS splits, etc. Both A 702 and B 704 exist in microframe 0 706.

Figure 8:
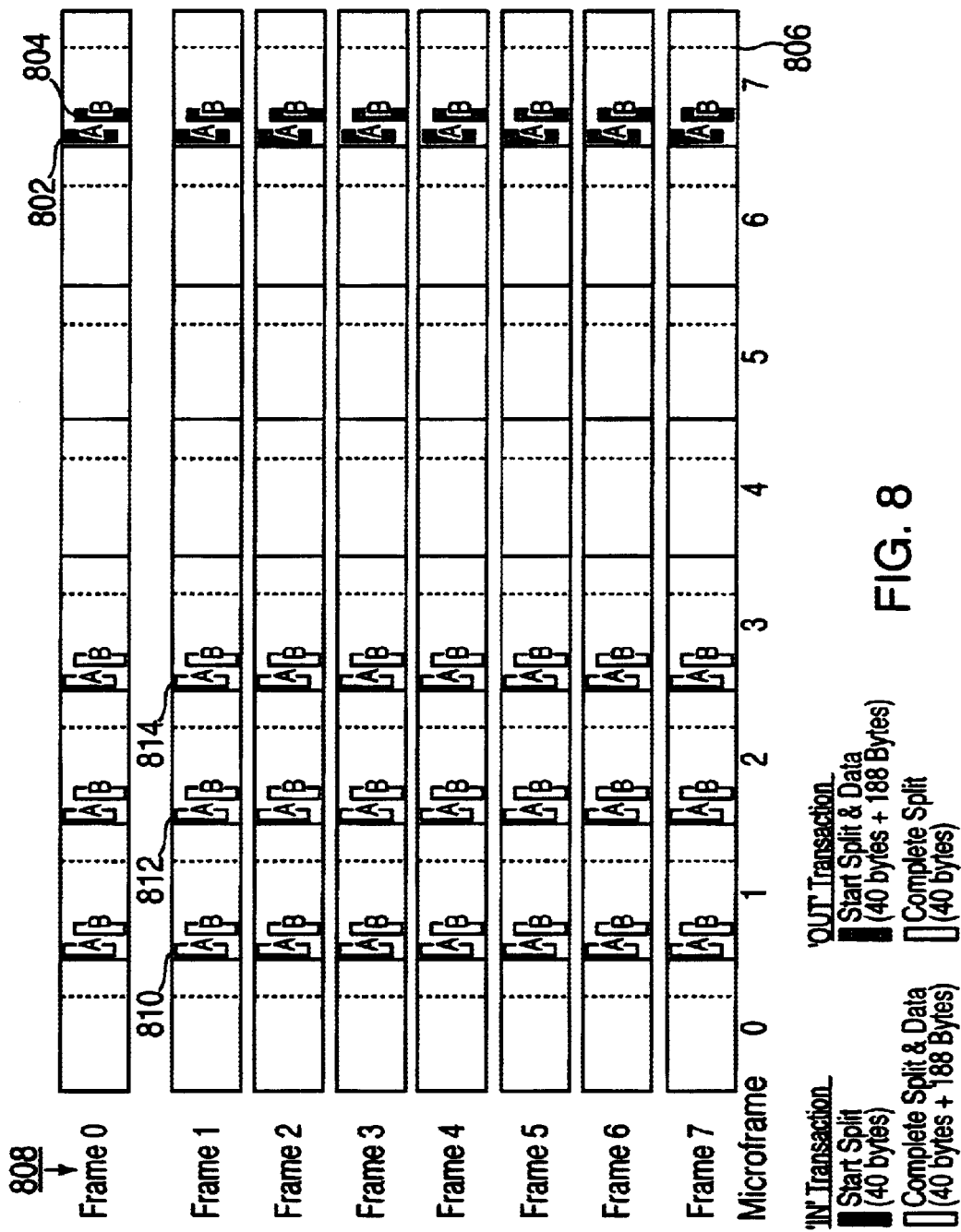
FIG. 8 provides a time chart illustrating the high-speed (HS) activity of Budget 1, under principles of the present invention.

FIG. 8 provides a time chart illustrating the HS activity of Budget 1, under principles of the present invention. This HS chart shows the timing of events on the HS bus (host to speed-translating hub). In one embodiment, as explained above, an occurrence of a start split, associated to an occurrence of its respective transaction, needs to exist in the microframe immediately preceding the microframe (byte location) corresponding to the beginning of the F/LS transaction. For example, an occurrence of start split A 802 and start split B 804 is allocated in the last microframe, microframe 7 806, of frame 0 808 to initiate the F/LS transaction in frame 1 708 (See FIG. 7).

To explain further, under one embodiment of the present invention, one occurrence of start split A 802 (40 bytes) exists in microframe 806 of frame 0 808. Assuming this is an 'In' transaction, the start split 802 is sent from the host 506 to the hub 520 via an HS bus 514 (See FIG. 5). This occurs during microframe 806 of frame 0 808 of the budget window. The data requesting token is then forwarded from the hub 520 to the device 502 at full/low-speed via the F/LS bus 524, and the device 502 (See FIG. 5) returns the requested data (and, if necessary, receives an acknowledgement) during the time allocated for the respective occurrence of F/LS transaction A 710 at the beginning of frame 1 708 (byte location corresponding to microframe 0 706) (See FIG. 7). Because the transaction 710 fits entirely within microframe 0 706 (See FIG. 7), in one embodiment, three complete splits follow in the three following microframe locations 810, 812, 814. As partially explained above, complete splits are allocated in each microframe after the microframe where the F/LS transaction begins to a microframe after the last microframe of the F/LS transaction (typically three microframes after the last transaction microframe). Because this is an 'In' transaction, each complete split allocation A 810, 812, 814 includes 40 bytes for the complete split plus up to 188 bytes for data.

In one embodiment, after receiving the data, the hub 520 waits to receive a complete split from the host 506 before forwarding the data at high-speed over the HS bus to the host 506. In one embodiment, after the last data packet of the transaction is received by the host 506, no more complete splits are sent to the hub 520 (See FIG. 5). Due to the transmission rate of the F/LS bus, no more than 188 bytes of information (of any kind) can be transferred during a microframe (125 μsec.) of time. Therefore, there is no need to allocate more than 188 bytes for data (per endpoint) on the HS bus, even though the HS bus can transfer 7500 bytes per microframe. The remaining time will be utilized for other endpoints (transactions) of the same or other device(s).

Figure 9:
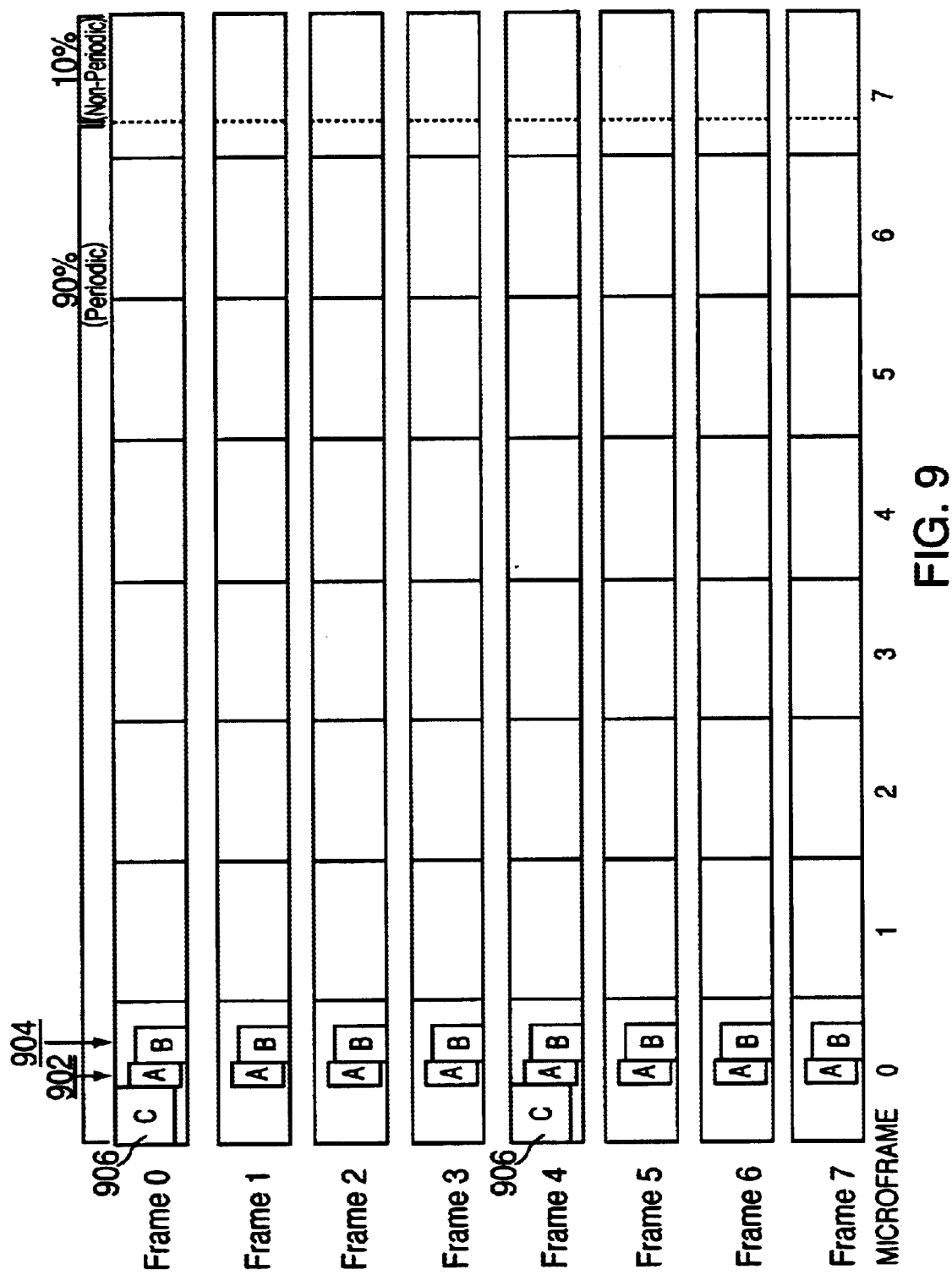
FIG. 9 provides a time chart of 'Budget 2', illustrating F/LS activity after the addition of transaction 'C' to Budget 1, under principles of the present invention.

FIG. 9 provides a time chart of 'Budget 2', illustrating F/LS activity after the addition of transaction 'C' to Budget 1, under principles of the present invention. In one embodiment, a third transaction, transaction 'C' 906 is added to the budget. Each occurrence of the transaction is placed at the beginning of its respective frame ahead of transaction 'A' 902 and transaction 'B' 904. This may be because transaction C is an Interrupt (slowest period to fastest, as explained above) and it has a period of four. All occurrences of A 902 and C 904 are delayed equally to accommodate C 906 even though most of the frames don't contain C 906. This is to make sure that all occurrences of each transaction are performed within the appropriate microframes, as expected on the high-speed bus. Because the total amount of time required by A 902, B 904, and C 906 does not cause the allocations to impinge upon the last ten percent (F/LS 90/10 rule), the budget would be potentially operable.

Figure 10:
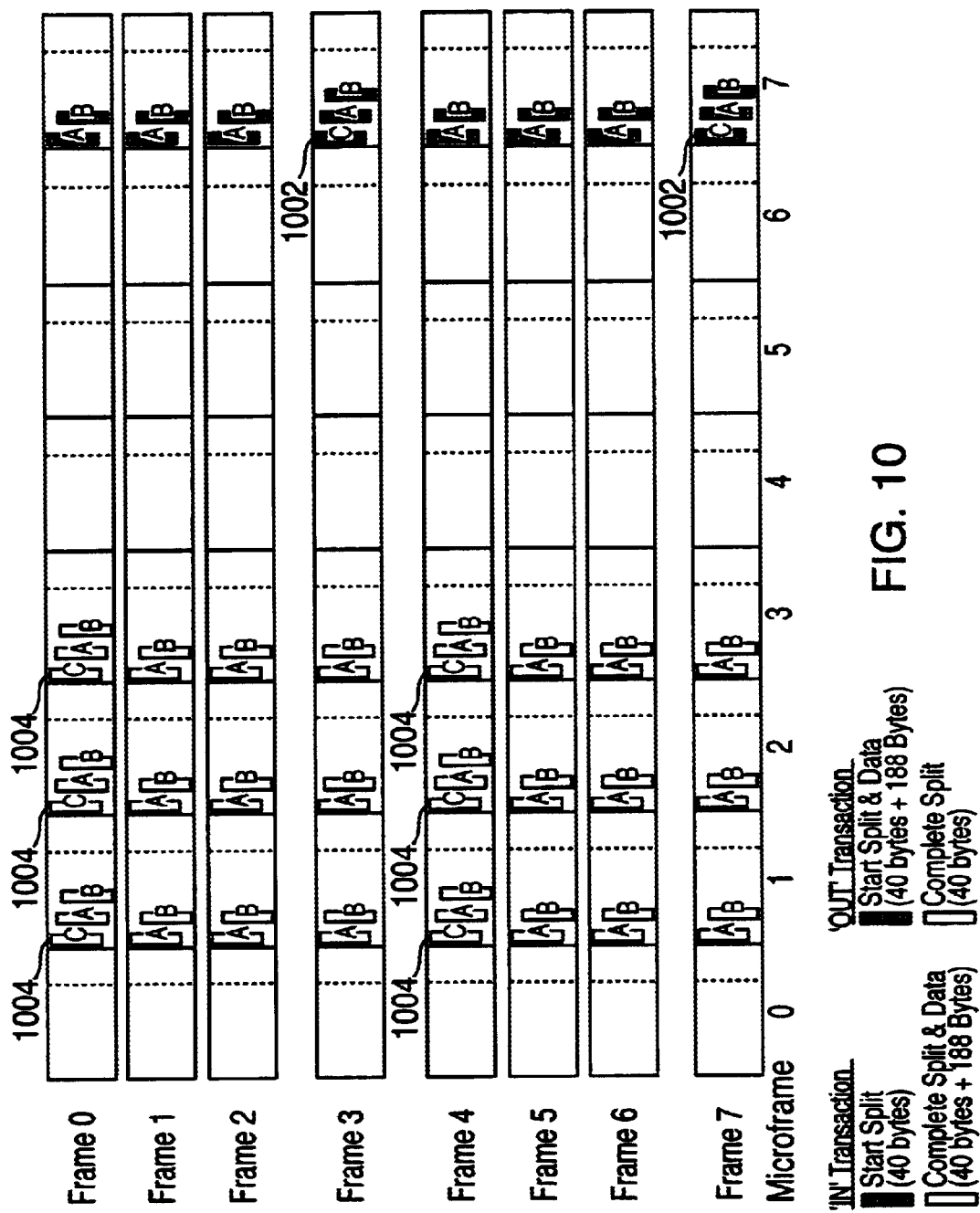
FIG. 10 provides a time chart illustrating the HS activity of Budget 2, under principles of the present invention.

FIG. 10 provides a time chart illustrating the HS activity of Budget 2, under principles of the present invention. In one embodiment, the start splits for C 1002 and the complete splits for C 1004 are inserted at the beginning of the respective microframes, and the following splits are moved over to accommodate. In one embodiment, the (HS) splits should consistently maintain the same relative sequence (per microframe) as the (F/LS) transactions (per frame).

Figure 11:
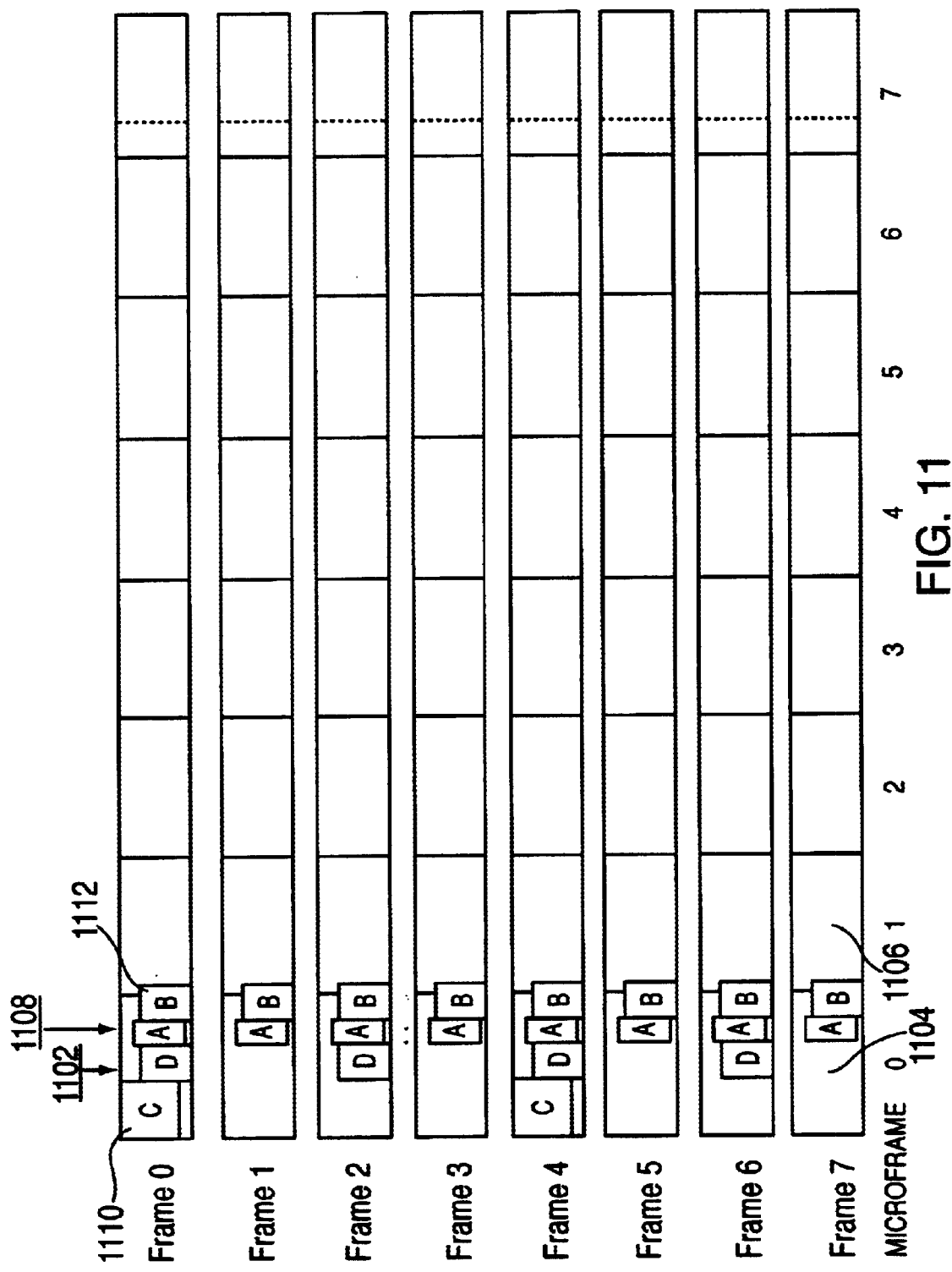
FIG. 11 provides a time chart of 'Budget 3', illustrating F/LS activity after the addition of transaction 'D' to Budget 2, under principles of the present invention.

FIG. 11 provides a time chart of 'Budget 3', illustrating F/LS activity after the addition of transaction 'D' to Budget 2, under principles of the present invention. In one embodiment, transaction D 1102, an Interrupt with a period of two, is inserted between C 1110 and A 1108 (to maintain a slowest to fastest period priority). Although B 1112 has a relatively short duration, because it now crosses between two microframes, microframe 0 1104 and microframe 1 1106, it now has four respective complete splits 1202 (See FIG. 12). As stated, complete splits are allocated in each microframe after the microframe where the F/LS transaction begins (microframe 0 1204, See FIG. 12) to a microframe three (typically) microframes after the last microframe of the F/LS transaction (microframe 4 1206, See FIG. 12).

Figure 12:
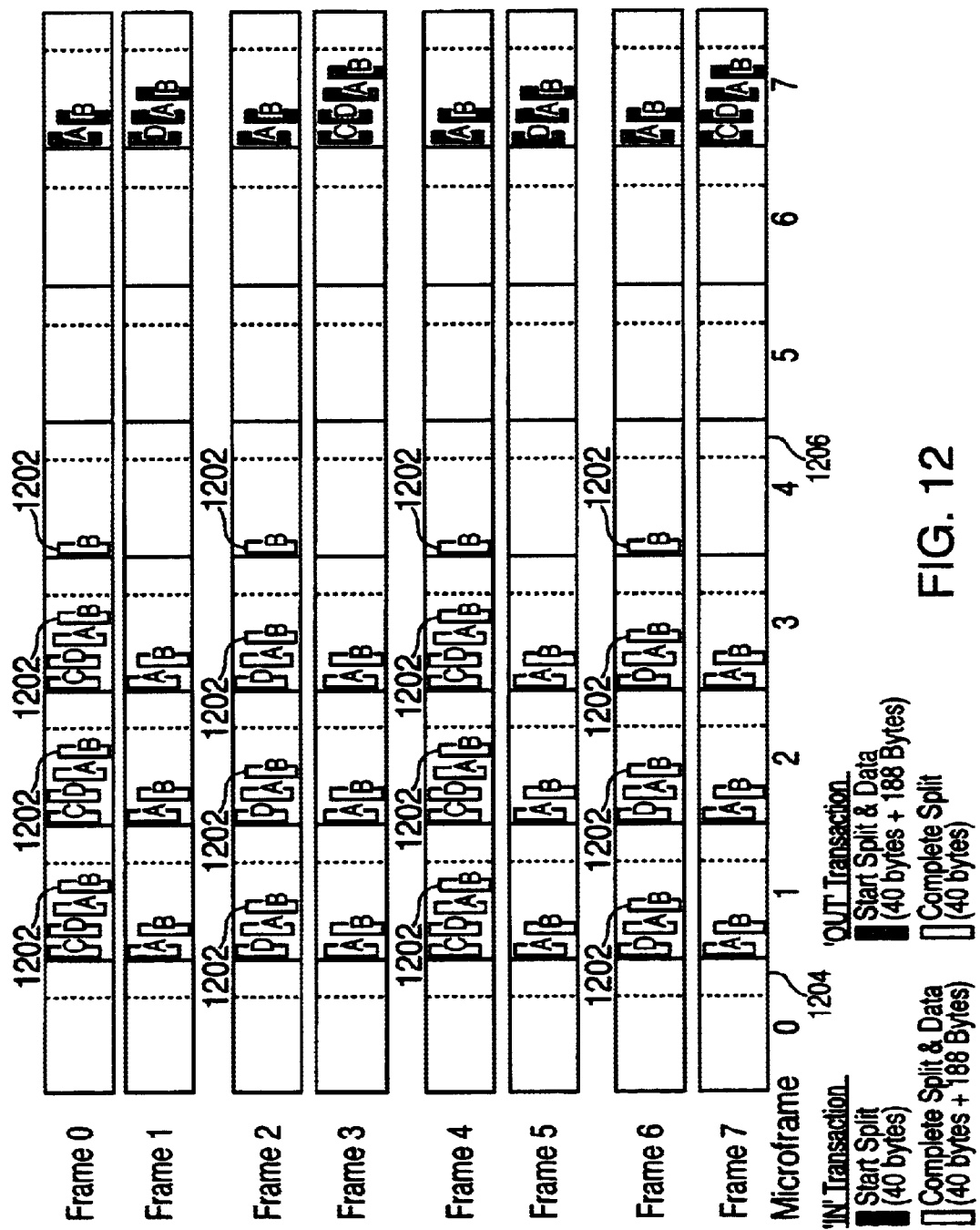
FIG. 12 provides a time chart illustrating the HS activity of Budget 3, under principles of the present invention.

FIG. 12 provides a time chart illustrating the HS activity of Budget 3, under principles of the present invention. Because split and data allocations do not use up more than eighty percent in any microframe, the HS 80/20 rule is satisfied.

Figure 13:
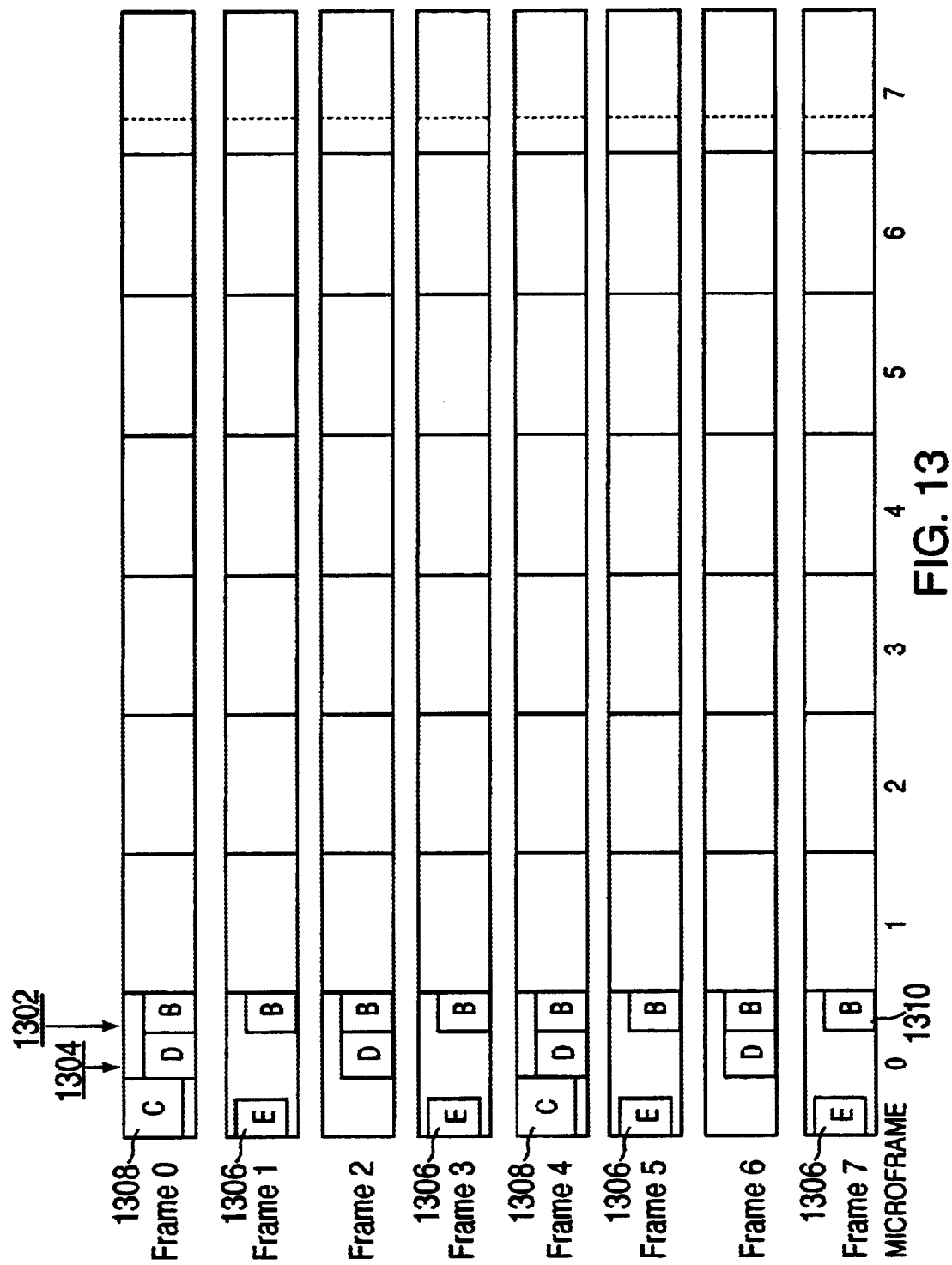
FIG. 13 provides a time chart of 'Budget 4', illustrating F/LS activity after the removal of transaction 'A' from and the addition of transaction 'E' to Budget 3, under principles of the present invention.

FIG. 13 provides a time chart of 'Budget 4', illustrating F/LS activity after the removal of transaction 'A' from and the addition of transaction 'E' to Budget 3, under principles of the present invention. In one embodiment, after A 1108 (See FIG. 11) is removed D 1304, and B 1302 can be advanced equally to take up the newly open space ('compaction'). Further, in one embodiment, E 1306, an Interrupt with a period of two, can be added before D 1304 and B 1302. Being consistent with protocol given the transaction type, E can be fitted into the spaces before D 1304 in the frames not occupied by C 1308 and not violate E's 1306 period or timing (correct microframe each frame) consistency.

Figure 14:
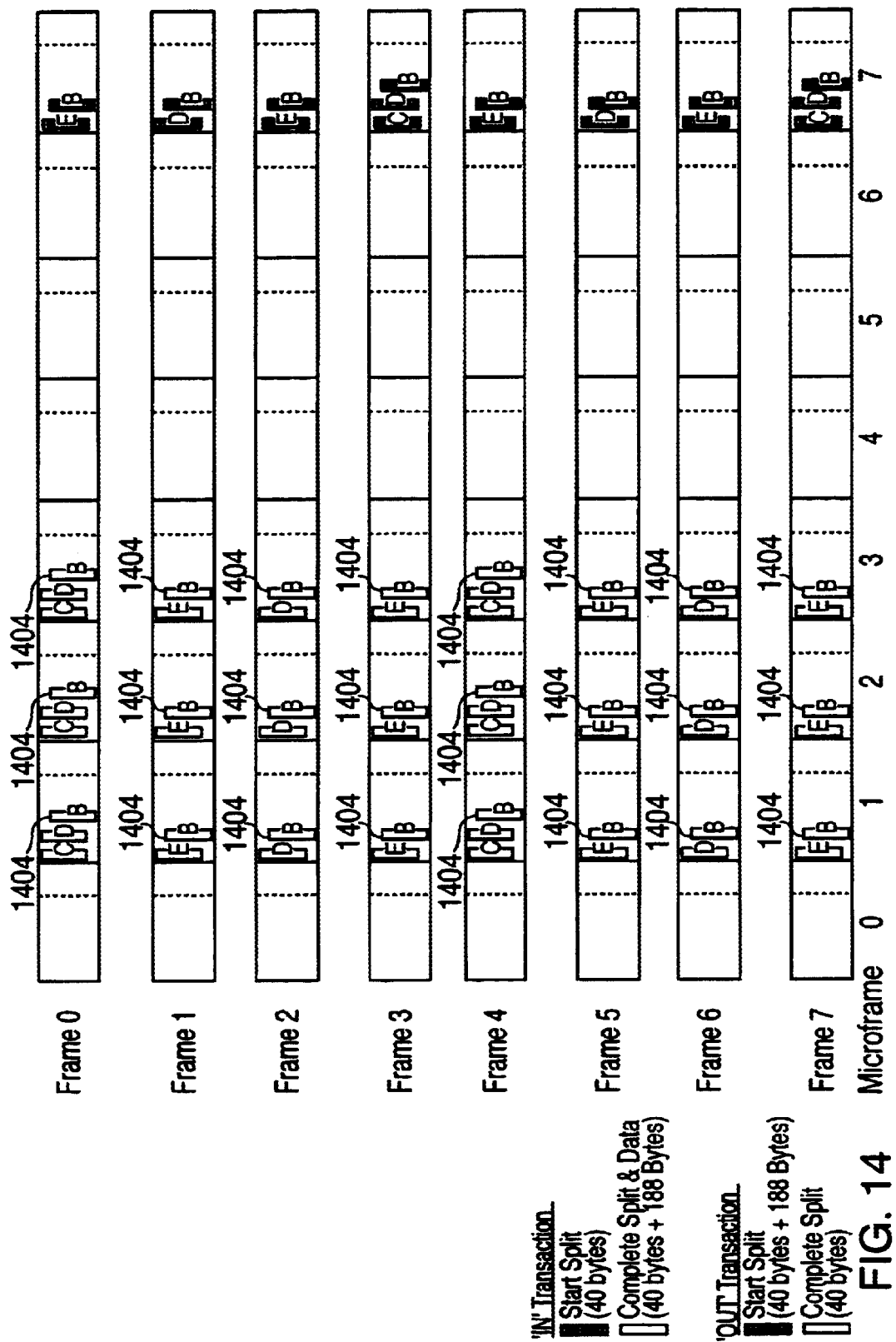
FIG. 14 provides a time chart illustrating the HS activity of Budget 4, under principles of the present invention.

FIG. 14 provides a time chart illustrating the HS activity of Budget 4, under principles of the present invention. In one embodiment, all splits/data are organized to maintain the same relative sequence of their respective F/LS transactions. In one embodiment, because B 1302 (See FIG. 13), by compaction, is now entirely within frame 0 1310 (See FIG. 11), only three occurrences of B's 1302 complete splits(/data) 1404 are necessary (no microframe boundary is crossed by transaction B 1302).

Figure 15:
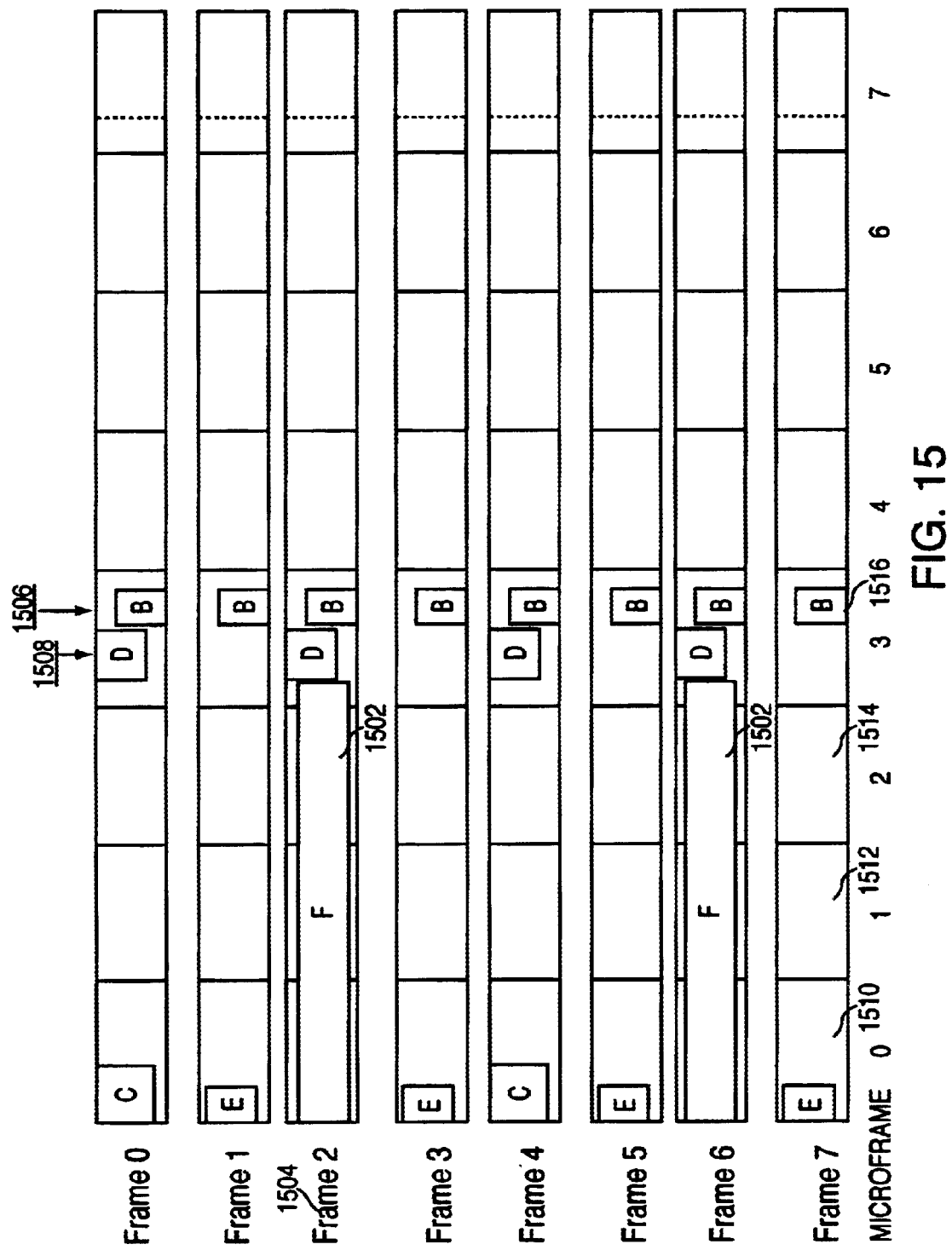
FIG. 15 provides a time chart of 'Budget 5', illustrating F/LS activity after the addition of transaction 'F' to Budget 4, under principles of the present invention.

FIG. 15 provides a time chart of 'Budget 5', illustrating F/LS activity after the addition of transaction 'F' 1502 to Budget 4, under principles of the present invention. In one embodiment, because F 1502, an Interrupt with a period of four, needs to be at the beginning of the frame, it is inserted where it causes the least relative disruption—starting at frame 2 1504. D 1508 and B 1506 are delayed accordingly.

Figure 16:
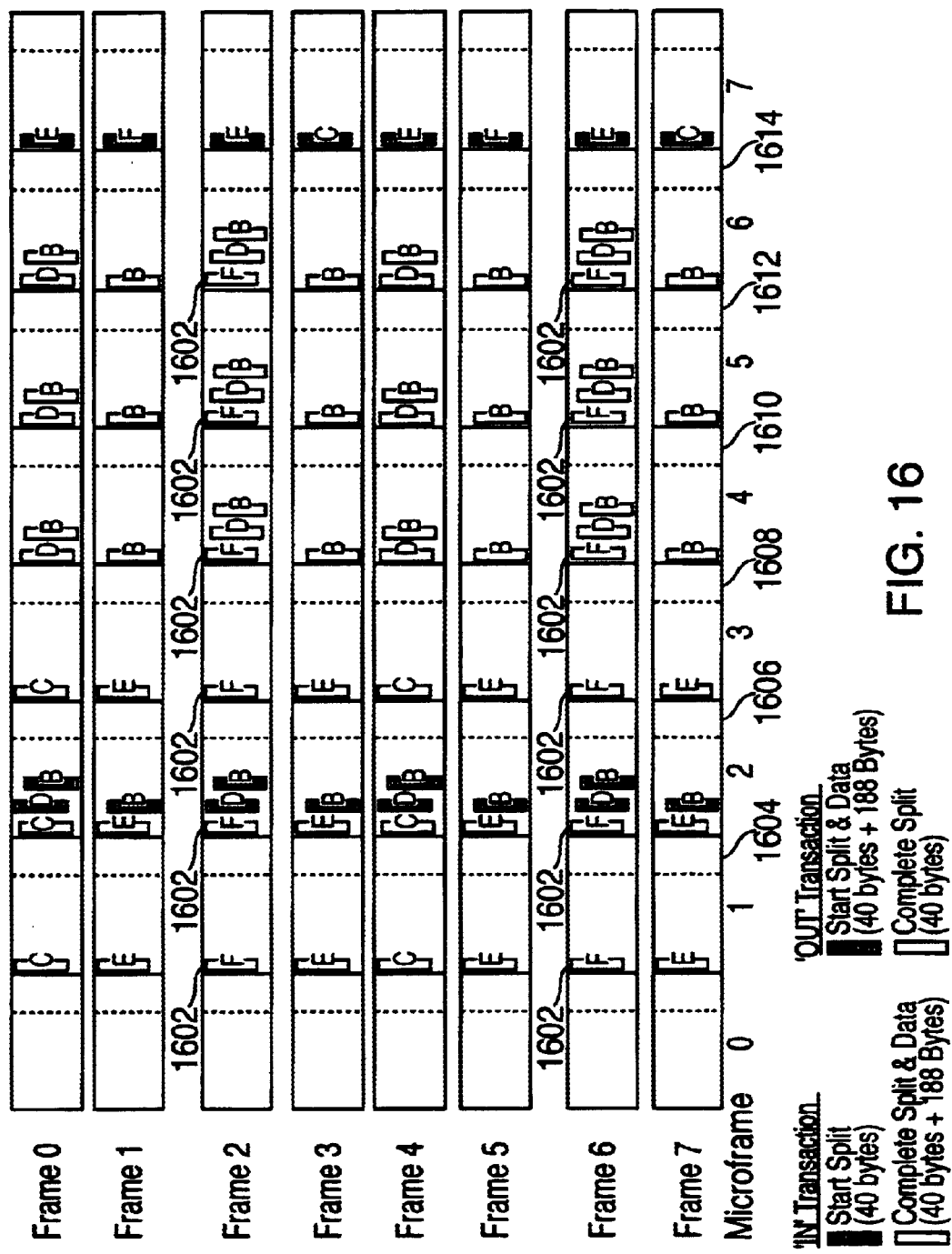
FIG. 16 provides a time chart illustrating the HS activity of Budget 5, under principles of the present invention.

FIG. 16 provides a time chart illustrating the HS activity of Budget 5, under principles of the present invention. Because F/LS transaction F 1502 exists in four microframes (0–3 1510, 1512, 1514, 1516) (See FIG. 15), there are six (HS) complete splits(/data) 1602 allocated, microframes 1–6 1604, 1606, 1608, 1610, 1612, 1614. Because split and data allocations do not use up more than eighty percent of any microframe, the HS 80/20 rule is satisfied.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method to budget communication between a host and a device, comprising:

determining a duration and a period for a first transaction at a first speed;

determining, consistent with said first transaction period, at least one frame from a plurality of frames in a budget window for addition of said first transaction, said at least one frame having an available first speed duration, and a plurality of available second speed durations;

verifying that said available first speed duration is at least as large as said first transaction duration;

determining a byte location for placement of said first transaction within said at least one frame and a first microframe of a plurality of microframes within said at least one frame, said first microframe corresponding to said byte location;

determining a plurality of second speed transaction durations associated to a plurality of respective second speed transactions, said plurality of second speed transactions associated to said first transaction; and verifying that each of said plurality of available second speed durations is at least as large as each respective second speed transaction duration.

2. The method of claim 1 wherein said first speed is a Universal Serial Bus (USB) full/low-speed and said second speed is a USB high-speed.

3. The method of claim 1, further comprising:

inserting said first transaction into the at least one frame;

inserting said plurality of second speed transactions into the plurality of microframes; and reorganizing a number of transactions in a number of frames of the budget window.

4. The method of claim 3, wherein said byte location for placement of said first transaction is determined as a first vacant location to accommodate the first transaction and corresponding to microframes capable of accommodating said second speed transactions, for each of the at least one frame.

5. The method of claim 3, wherein the first transaction is a periodic transaction.

6. The method of claim 3, wherein each frame of said plurality of frames includes eight microframes.

7. The method of claim 3, wherein the plurality of second speed transactions comprise a start split transaction, a number of complete split transactions, and at least one data element transaction.

8. The method of claim 3, wherein said number of transactions are reorganized for host controller transaction ordering requirements.

9. The method of claim 8, wherein said number of transactions are reorganized based on a period for each of said number of transactions.

10. The method of claim 7, wherein each microframe of the plurality of microframes has a first speed capacity of no more than 188 bytes and a second speed capacity of no more than 7500 bytes.

11. The method of claim 7, wherein each data element transaction of the at least one data element transaction has an allocation size of no more than 188 bytes, the start split transaction has an allocation size of 40 bytes, and each complete split transaction has an allocation size of 40 bytes.

12. The method of claim 11, wherein each second speed transaction duration is equal to a sum of the allocation sizes of each respective second transaction in each respective microframe.

13. The method of claim 12, wherein a quantity of said number of complete splits equals a first transaction size divided by the allocation size of each data element; and a total number of complete splits equals said quantity, rounded up to a nearest integer, plus a number.

14. The method of claim 7, wherein the at least one frame is determined by designating an initial frame in the budget window and if a number of frames in the plurality of frames is less than the period, designating at least one subsequent frame, consistent with the period.

15. The method of claim 14, wherein the initial frame is designated through analysis with an algorithm, each frame in the budget window being under constraint of the available first speed duration being greater than the first transaction duration.

16. The method of claim 14, wherein the available first speed duration is a total duration of a frame of said at least one frame minus a first amount of time associated to a number of preexisting first speed transaction allocations in said frame.

17. The method of claim 16, wherein each available second speed duration is said total duration divided by a quantity of said microframes in said plurality of microframes, minus a second amount of time associated to a number of preexisting second speed transaction allocations in each respective microframe.

18. The method of claim 17, wherein each available second speed duration is said total duration divided by said quantity, minus said second amount of time minus twenty percent of said total duration divided by said quantity.

19. The method of claim 16, wherein the available first speed duration is said total duration minus said first amount of time minus a percentage of time devoted to non-periodic transactions minus a percentage of time for accommodation of bit stuffing.

20. The method of claim 19, wherein said percentage of time devoted to non-periodic transactions is ten percent of said total duration and said percentage of time for accommodation of bit stuffing is sixteen percent of the total duration.

21. The method of claim 16, wherein said start split is allocated to a microframe immediately preceding said first microframe, and each complete split transaction is allocated to a number of microframes immediately subsequent to said first microframe, one complete split transaction per microframe.

22. The method of claim 21, wherein if the first transaction is an 'In' transaction, each data element of the at least one data element is allocated to said number of microframes immediately subsequent to said first microframe, one data element per microframe.

23. The method of claim 21, wherein if the first transaction is an 'Out' transaction, the at least one data element is allocated to said microframe immediately preceding said first microframe.

24. A set of instructions residing in a storage medium, said set of instructions to be executed by a processor to budget communication between a host and a device, comprising:

determining a duration and a period for a first transaction at a first speed;

determining, consistent with said first transaction period, at least one frame from a plurality of frames in a budget window for addition of said first transaction, said at least one frame having an available first speed duration, and a plurality of available second speed durations;

verifying that said available first speed duration is at least as large as said first transaction a duration;

determining a byte location for placement of said first transaction within said at least one frame and a first microframe of a plurality of microframes within said at least one frame, said first microframe corresponding to said byte location;

determining a plurality of second speed transaction durations associated to a plurality of respective second speed transactions, said plurality of second speed transactions associated to said first transaction; and verifying that each of said plurality of available second speed durations is at least as large as each respective second speed transaction duration.

25. The set of instructions of claim 24, further comprising:

inserting said first transaction into the at least one frame;

inserting said plurality of second speed transactions into the plurality of microframes; and reorganizing a number of transactions in a number of frames of the budget window.

26. The set of instructions of claim 25, wherein said byte location for placement of said first transaction is determined as a first vacant location to accommodate the first transaction and corresponding to microframes capable of accommodating said second speed transactions, for each of the at least one frame.

27. A system to budget communication between a host and a device, comprising:

a host to be communicatively coupled to a device, said device associated to a first transaction at a first speed; wherein said host to determine a first transaction duration required for said first transaction, and a period for said first transaction;

said host to determine, consistent with said period, at least one frame from a plurality of frames in a budget window for addition of said first transaction to said at least one frame, said at least one frame having an available full/low-speed duration, and an available high-speed duration;

said host to verify that said available full/low-speed duration is at least as large as said first transaction duration;

said host to determine a byte location for placement of said first transaction within said at least one frame and a first microframe of a plurality of microframes within said at least one frame, said first microframe corresponding to said byte location;

said host to determine a total time necessary for a plurality of high-speed transactions associated to said first transaction; and said to host verify that said available high-speed duration is at least as large as said total time.

28. The system of claim 27, wherein said host is to:

insert said first transaction into the at least one frame;

insert said plurality of high-speed transactions into the plurality of microframes; and reorganize a number of transactions in a number of frames of the budget window.

29. The system of claim 28, wherein said host is to determine said byte location for placement of said first transaction as a first vacant location to accommodate the first transaction and corresponding to microframes to accommodate said high-speed transactions, for each of the at least one frame.

30. A method to budget communication between a host and a device, comprising:

removing a full/low-speed (FLS) first transaction of a number of FLS transactions from at least one frame of a plurality of frames in a budget window;

removing a number of high-speed (HS) first transactions of a number of HS transactions from a plurality of microframes within said at least one frame, said HS first transactions associated to said FLS first transaction;

determining a FLS first transaction duration and period;

determining, consistent with said period, said at least one frame for removal of said FLS first transaction from said at least one frame; and advancing in time equally FLS subsequent transactions, of said number of FLS transactions, occurring subsequent to said FLS first transaction in said plurality of frames of said budget window and advancing HS subsequent transactions, of said number of HS transactions, associated to said respective FLS subsequent transactions.

31. The method of claim 30, wherein said FLS subsequent transactions are advanced an amount equal to said FLS first transaction duration.

* * * * *